J. R. BROWN.
Pipe-Tongs.

No. 145,929.                                    Patented Dec. 30, 1873.

Witnesses
S. N. Piper
L. N. Miller

James R. Brown
by his attorney
R. H. Eddy

UNITED STATES PATENT OFFICE.

JAMES R. BROWN, OF CAMBRIDGEPORT, MASSACHUSETTS, ASSIGNOR TO HIMSELF AND HAZEN P. HUNTOON, OF SAME PLACE.

IMPROVEMENT IN PIPE-TONGS.

Specification forming part of Letters Patent No. 145,929, dated December 30, 1873; application filed October 31, 1873.

*To all whom it may concern:*

Be it known that I, JAMES R. BROWN, of Cambridgeport, of the county of Middlesex and State of Massachusetts, have invented a new and useful Improvement in Pipe-Tongs; and do hereby declare the same to be fully described in the following specification, and represented in the accompanying drawings, of which—

Figure 1:
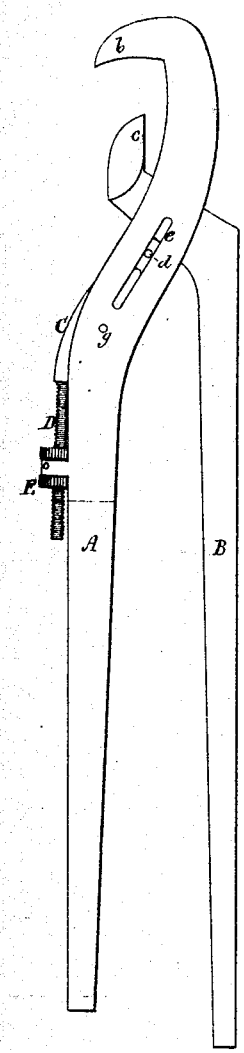
Figure 2:
Figure 3:
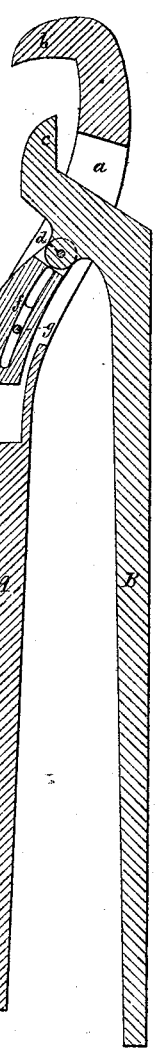
Figure 4:
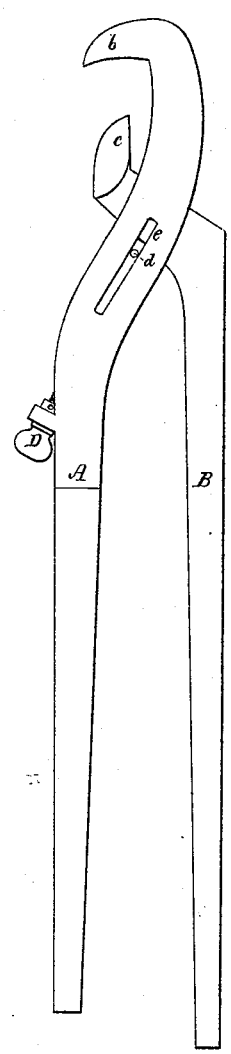

Figure 1 is a side view, Fig. 2 an edge view, and Fig. 3 a longitudinal section, of a pipe-tongs provided with my invention. Fig. 4 is a side elevation, and Fig. 5 a longitudinal section, of the tongs, showing a modification in the construction and application of the adjusting-screws with reference to the pivotal arm and the hook-jaw lever.

These tongs are analogous in some respects to those as described in the United States Patents 134,798, 136,089, in which the tooth-jaw lever extends through a slot in the hook-jaw lever; but my tongs differ mainly from the tongs shown in Patent 136,089, in having combined with the hook-jaw lever, and with the block or arm which is hinged to the tooth-jaw lever, adjusting-screws so connected with the hook-jaw lever and such block or arm as to be capable of moving the tooth-jaw lever in each of two directions, for the adjustment of the jaws nearer to or farther from each other.

Figure 5:
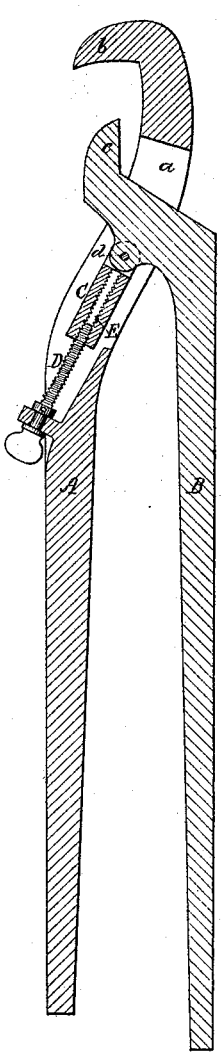

In the drawings, A denotes the hook-jaw lever; and B, the tooth-jaw lever, the former being constructed with a long slot, $a$, through which the latter passes. The hook jaw is shown at $b$, and the tooth jaw at $c$. There is hinged to that part of the tooth-jaw lever, which is within the slot $a$, an arm, C, which, in Figs. 1, 2, and 3, is represented as having its hinge pin or stud $d$ going through or into a slot, $e$, made lengthwise in the hook-jaw lever, and crossing the slot $a$, such pin or stud $d$ and slot $e$ serving as guides and supports for the tooth-jaw lever and the pivotal arm. Furthermore, the said arm C, as shown in Fig. 3, is also slotted lengthwise, as represented at $f$, the slot $f$ receiving a pin, $g$, which, arranged as shown in Figs. 1 and 2, goes through the slot $f$ and the hook-jaw lever, and with the slot operates to prevent the crippling or bending of the adjusting male screw D while the tongs may be in use. Such screw, arranged as shown, projects directly from the pivotal arm C, is united therewith, and screws through a milled nut, E, connected with the hook-jaw lever so as to be immovable therewith, except in being revolved upon the screw. By turning the nut one way on the screw, the latter, the arm C, and the tooth-jaw lever will be moved simultaneously in a direction toward the hooked jaw, but by revolving the nut in the opposite way, a counter-movement of the arm and hook jaw lever will be effected. Instead of using a nut to the adjusting-screw, I sometimes apply the said screw directly to the hooked-jaw lever, and screw the said screw into a female screw made in the pivotal arm C, such being as shown in Figs. 4 and 5. The screw D in such case is to be connected with the hook-jaw lever, so as to be incapable of endwise motion relatively thereto, though capable of being revolved axially, the female screw to receive the screw D, being shown at E in Fig. 5.

By employing the arm C and adjusting-screws or devices connected with it and the hook-jaw lever in manner as described, it will be seen that by means of such devices or screws the tooth-jaw lever may be moved either way—that is, either toward or away from the hook jaw, as occasion may require. Thus I avoid the evils resulting from or attendent upon an adjusting-screw, to simply bear at its inner end against either the tooth-jaw lever or a block hinged thereto.

I do not claim the tooth-jaw lever hinged to a block and arranged in and with a slot in the hook-jaw lever, and the latter lever provided with a screw to screw through it and against the block without such screw being at its inner end connected with the said block, all being as shown in the aforesaid Patent No. 136,089.

I claim—

In the pipe-tongs having the two crossed levers A B, and the arm C, and its adjusting-screws D E, arranged as described, the said arm C, supported by the fulcrum-pin $d$, the pin $g$, and the cross-slots $e$ and $f$, arranged in the arm and the lever A, substantially in manner as shown and explained.

JAMES R. BROWN.

Witnesses:
   R. H. EDDY,
   J. R. SNOW.